United States Patent
Österberg et al.

(10) Patent No.: US 12,378,369 B2
(45) Date of Patent: Aug. 5, 2025

(54) LIGNIN PARTICLE BASED HYDROGEL AND THE METHOD FOR PREPARATION OF LIGNIN COLLOIDAL PARTICLES BY SOLVENT EVAPORATION PROCESS

(71) Applicant: Aalto University Foundation sr, Aalto (FI)

(72) Inventors: Monika Österberg, Aalto (FI); Mika Sipponen, Aalto (FI); Mauri Kostiainen, Aalto (FI); Laura Äkräs, Aalto (FI); Guillaume Rivière, Aalto (FI); Xue Zhang, Aalto (FI)

(73) Assignee: Aalto University Foundation sr, Aalto (FI)

( * ) Notice: Subject to any disclaimer, the term of this patent is extended or adjusted under 35 U.S.C. 154(b) by 942 days.

(21) Appl. No.: 17/298,622

(22) PCT Filed: Nov. 29, 2019

(86) PCT No.: PCT/FI2019/050858
§ 371 (c)(1),
(2) Date: May 31, 2021

(87) PCT Pub. No.: WO2020/109671
PCT Pub. Date: Jun. 4, 2020

(65) Prior Publication Data
US 2022/0010077 A1    Jan. 13, 2022

(30) Foreign Application Priority Data

Nov. 29, 2018   (FI) .................................... 20186020

(51) Int. Cl.
*C08J 3/07*     (2006.01)
*C08L 97/00*    (2006.01)
*C09K 23/00*    (2022.01)

(52) U.S. Cl.
CPC ............... *C08J 3/07* (2013.01); *C08L 97/005* (2013.01); *C09K 23/00* (2022.01); *C08J 2397/00* (2013.01); *C08L 2201/54* (2013.01)

(58) Field of Classification Search
CPC ......... C08J 3/07; C08J 2397/00; C09K 23/00; C08L 97/005; C08L 2201/54
See application file for complete search history.

(56) References Cited

U.S. PATENT DOCUMENTS

| | | |
|---|---|---|
| 3,808,192 A | 4/1974 | Dimitri |
| 4,957,557 A | 9/1990 | Dimitri |

(Continued)

FOREIGN PATENT DOCUMENTS

| | | |
|---|---|---|
| CN | 103275331 A | 9/2013 |
| CN | 105153720 A | 12/2015 |

(Continued)

OTHER PUBLICATIONS

Yearla et al ("Preparation and characterization of lignin nanoparticles: evaluation of their potential as antioxidants and UV protectants", Journal of Experimental Nanoscience, vol. 11, No. 4, pp. 289-302, Jun. 18, 2015). (Year: 2015).*

(Continued)

*Primary Examiner* — Jiangtian Xu
(74) *Attorney, Agent, or Firm* — Laine IP Oy

(57) ABSTRACT

Method of preparing a dispersion of colloidal lignin particles by providing a solution of lignin in a mixture of an organic solvent for lignin and a non-solvent for lignin having a ratio of non-solvent to solvent; and increasing the ratio of the non-solvent to the solvent to produce an aqueous dispersion of colloidal lignin particles. The dispersions are stable and the colloidal lignin particles are useful for many applications such as rheology modifiers in three-dimensional printing of (Continued)

hydrogels, or in purification systems such as filters, and packed columns, and as flocculants.

16 Claims, 6 Drawing Sheets

(56) References Cited

U.S. PATENT DOCUMENTS

| | | | |
|---|---|---|---|
| 9,102,801 | B1 | 8/2015 | Dirk et al. |
| 2015/0166836 | A1 | 6/2015 | Liu et al. |
| 2016/0312031 | A1 | 10/2016 | Qiu et al. |
| 2017/0247835 | A1* | 8/2017 | Leschinsky .............. D21C 3/22 |

FOREIGN PATENT DOCUMENTS

| | | |
|---|---|---|
| CN | 104371117 B | 9/2016 |
| CN | 106276848 A | 1/2017 |
| CN | 106361591 A | 2/2017 |
| CN | 106497149 A | 3/2017 |
| CN | 106574053 A | 4/2017 |
| CN | 106633967 A | 5/2017 |
| CN | 107693506 A | 2/2018 |
| CN | 107774204 A | 3/2018 |
| CN | 108610492 A | 10/2018 |
| WO | WO2017197530 A1 | 11/2017 |

OTHER PUBLICATIONS

Wang et al ("Structures and pyrolytic characteristics of organosolv lignins from typical softwood, hardwood and herbaceous biomass", Industrial Crops & Products 171 (2021) 113912) (Year: 2021).*

Qian et al ("Fabrication of uniform lignin colloidal spheres for developing naturalbroad-spectrum sunscreens with high sun protection factor", Industrial Crops and Products 101 (2017) 54-60). (Year: 2017).*

Lievonen et al: A simple process for lignin nanoparticle preparation. Green Chemistry, Jan. 1, 2016, vol. 18, No. 5, pp. 1416-1422.

Qian et al: Fabrication of uniform lignin colloidal spheres for developing natural broad-spectrum sunscreens with high sun protection factor. Industrial Crops and Products, Mar. 11, 2017, vol. 101, pp. 54-60.

Sipponen et al: All-Lignin Approach to Prepare Cationic Colloidal Lignin Particles: Stabilization of Durable Pickering Emulsions. Green Chem., 2017, vol. 19, No. 24, pp. 5831-5840.

Srinivasa et al: Preparation and characterisation of lignin nanoparticles: evaluation of their potential as antioxidants and UV protectants. Journal of Experimental Nanoscience, Jun. 18, 2015, pp. 289-302.

Zhang et al: Synthesis of lignocellulose-based composite hydrogel as a novel biosorbent for Cu2+removal. Cellulose, Springer Netherlands, Oct. 6, 2018, vol. 25, No. 12, pp. 7315-7328.

Bian et al: Lignin nanoparticles as nano-spacers for tuning the viscoelasticity of cellulose nanofibril reinforced polyvinyl alcohol-borax hydrogel. European Polymer Journal, Oct. 31, 2018, vol. 107, pp. 267-274.

* cited by examiner

| wt-% evaporated | | | |
|---|---|---|---|
| 30% | 63% | 74% | 79% |

Fig. 9

LIGNIN PARTICLE BASED HYDROGEL AND THE METHOD FOR PREPARATION OF LIGNIN COLLOIDAL PARTICLES BY SOLVENT EVAPORATION PROCESS

FIELD OF INVENTION

The invention belongs to the technical field of preparation of nanomaterials and uses thereof. In particular, the invention relates to the production of colloidal particles from lignin for example by a solvent evaporation process using volatile aqueous-organic mixtures as solvents for lignin, and applications of said particles in hydrogel formulations for additive manufacturing.

BACKGROUND OF THE INVENTION

Increased utilization of renewable resources will be needed to reduce the dependency on fossil oil for energy and materials. Lignin is an untapped phenolic polymer of plant biomass. Its structural heterogeneity and poor compatibility with synthetic (biodegradable or not) polymers has constrained development of lignin-based material applications.

Currently, lignin is isolated on commercial scale from spent pulping liquors by precipitation and membrane filtration techniques. Chemical modification of lignin by various synthetic schemes can improve compatibility and improve properties of lignin-based materials. However, such approaches are expensive and increase the carbon footprint of the product as contrasted to using lignin without covalent modifications.

US20150166836A1 describes preparation of lignin particles by dissolving lignin in alkali under stirring and elevated temperature, allowing a reduction in alkalinity to around pH 8-9, and subsequently cooling the dispersion to room temperature.[1] Acidification of alkaline solution of lignin is a basis of several prior works. They all have in common that irregular aggregates are formed. For instance, CN103275331A discloses freeze-drying acid-precipitated lignin to obtain 50-280 nm particles.[2] Covalent modification of lignin is another common approach in particle preparation. CN106276848B discloses preparation of spherical lignin particles from azo-modified lignin by adding water into lignin organic solution, and carbonization calcined at 300-1200° C.[3] CN106633967A discloses forming coated nanoparticles (NPs) by adding water as non-solvent into ethanol suspension of titanium dioxide NPs in the presence of an electrostatic complex of cationized lignin and an anionic surfactant.[4] U.S. Pat. No. 9,102,801B1 discloses mechanical particle size reduction of lignin into particle size less than 40 nm, and reacting said lignin with a diazonium precursor to link it covalently with polymers such as rubber.[5] US2016312031A1 discloses synthesis of carboxylated lignin, reacting it with cross-linked hydroxyl phosphate compound, and depositing the product as a coating polymer on inorganic NPs.[6] WO2017197530A1 discloses using lignin as a coating to titanium dioxide NPs to reduce their catalytic generation of reactive oxygen species.[7] U.S. Pat. No. 3,808,192 discloses spray drying of heat-coagulated lignin particles precipitated from solution.[8] U.S. Pat. No. 4,957,557 discloses reacting lignin with formaldehyde in alkaline solution and subsequent formation of colloidal particles with median particle size less than 30 nm.[9] CN106574053A discloses preparation of lignin particles by hydrothermal treatment of lignin solutions.[10] CN106497149A discloses preparation of carbon black from lignin by hydrothermal carbonization of oxidized lignin derivatives.[11] CN105153720BG discloses forming inverted lignin NPs by adding a non-solvent (cyclohexane, petroleum ether or n-pentane) into a solution of lignin in an organic solvent such as tetrahydrofuran, dioxane or dimethyl sulfoxide.[12] CN104371117B discloses preparation of lignin dithiocarbamate NPs through a multistep synthesis route.[13] CN107693506A discloses preparation of pharmaceutical formulation by co-precipitation of liposoluble drugs and lignin from organic solvent solution by mixing it with an aqueous suspension of magnetic NPs.[14] CN106361591A discloses preparation of lignin NPs by adding water as non-solvent into lignin solution in acetone-water solvent mixture.[15] The resulting lignin NPs are 50-300 nm solid spherical particles. The volume ratio of acetone to water in the solvent mixture was from 4:1 to 8:1. CN106832327A discloses synthesis of fluorescence-modified 30-300 nm lignin NPs by reacting lignin with a silane coupling agent and a fluorescent reagent followed by ultrasonication in water.[15] CN108610492A describes preparation of pH-sensitive nanocomposite hydrogels comprising lignin NPs in methylcellulose matrix.[16] CN103254452A discloses preparation of lignin NPs by dissolving lignin in an organic solvent, adding inorganic acid to form a colloid, adding a cross-linking agent, adding water, and dialyzing against water to purify the lignin NPs with a particle size of 20 nm to 200 nm.[16] The prior art presented above does not embody one-pot approaches to prepare colloidally stable spherical lignin nanoparticles from chemically unmodified lignin precursors. Moreover, the prior art does not disclose applications for colloidal lignin particles in hydrogel matrixes such as rheology modifiers of hydrogels used in additive manufacturing (3D printing) or for stabilization of printed constructs during storage or use.

SUMMARY OF THE INVENTION

The present invention provides a new method for the preparation of colloidal lignin particles (lignin nanoparticles).

It has unexpectedly been found that colloidal lignin particles, which are submicrometer compact spheres, can be produced from unmodified lignin. The particles can be produced, for example, using a one-pot solvent evaporation approach.

The resulting colloidal lignin particles are antioxidant, provide shielding from ultraviolet light, and show excellent compatibility and viscosity increment in cellulose nanofibril hydrogels.

Further, the invention also presents an unexpected finding that the colloidal lignin particles function as rheology modifier in hydrogels used in additive manufacturing, significantly facilitating easy printing of e.g. otherwise challenging CNF hydrogel. The particles furthermore stabilize the hydrogels so that they retain their shape during storage or use in elevated humidity or in aqueous buffer solution.

The process of the invention enables the production of colloidal lignin particles with controlled mean particle diameter from 80 nm to approximately 500 nm.

More specifically, the present invention is characterized by what is stated in the characterizing parts of the independent claims.

Considerable advantages are obtained. Thus, the present invention provides a simple way to improve structure retention of extruded hydrogels. The particles can be produced by a method which does not generate wastewater (for example evaporation of solvent or dilution with non-solvent).

The inventive composite hydrogel formulation contains preferably only renewable natural polymers. CLPs are spherical lignin particles that can be prepared from various different lignins, including commercially available technical lignins.

The invention presents a simple process that employs in particular a one-pot method to recycle solvents and simultaneously forming submicrometer colloidal lignin particles. The invention does not require fractionation of the colloidal dispersion after its formation, which provides stability to the dispersion, and avoids generation of dilute wastewater streams that represent a formidable challenge in the regular non-solvent precipitation (solvent exchange) processes. Preferably, the dispersion is not concentrated by filtration. In some embodiments, a dispersion having a 10 wt % (solid matter) concentration is obtained which can be used as such.

The colloidal lignin particles are useful for many applications such as rheology modifiers in three-dimensional printing of hydrogels.

By formulating CLPs in CNF-based hydrogels, the structure collapse that occurs in the absence of CLPs can be avoided. The importance of this improved structure retention is obvious for example when using the hydrogels as media for 3D cell culture. In this application, viability of living cells is crucially dependent on the surrounding support matrix, i.e. CNF or CNF-alginate hydrogel.

In one embodiment, an addition of CLP is used for increasing viscosity of a CNF-alginate hydrogel. It furthermore increases the form stability in hydrogels stored in physiological electrolyte solution.

In embodiments, the present invention increases stability of the hydrogel objects and can stabilize living cells in the matrix. Toxic crosslinking methods can be avoided. Improved cell viability in 3D cell culture improves productivity of therapeutics or other cell metabolites. Improved structure retention of the hydrogel may enable development of better scaffolds for regenerative medicine and tissue engineering applications.

The viscosity of CNF hydrogels and thus the water retention can be adjusted by altering the consistency (dry matter concentration).

In embodiment, the present invention can be used in water purification systems such as in filters, in packed columns, or as flocculants.

In embodiment, the present invention can also be used in technology for binding and optionally separating viruses in particular in aqueous ambient.

In the following, preferred embodiments and accompanying drawings are described in sufficient detail to enable those skilled in the art to practice the invention.

An example of the process for forming colloidal lignin particles using the invention is also provided.

Definitions for certain terms used throughout the specification are given, followed by a description of various embodiments of the present invention in examples 1-8.

BRIEF DESCRIPTION OF DRAWINGS

FIGS. 3a and b are graphical depictions of the particle size and zeta-potential and polydispersity index (PdI), respectively, depending on pH; FIG. 3c is a TEM micrograph and FIG. 4d comprises photographs of aqueous CLPs dispersions;

FIG. 4a is a graphical depiction of the effect of initial lignin concentration on particle size (-●-) and zeta-potential (--◆--) whereas FIG. 4b shows the mass yield, and FIG. 4c shows photographs of the appearance of lignin particles formed upon rotary evaporation;

FIG. 9 shows the efficiency of virus removal from water with CLPs or modified CLPs using either filtration or sedimentation. a) is a schematic illustration of a simplified process for removing viruses, b) shows absorbance of the supernatant after centrifugation of CCMVs mixed with increasing concentration of CLPs or c-CLPs (a decrease in absorbance means that viruses are removed). c) Remaining CCMV concentration before and after filtration through a 0.45 μm membrane.

EMBODIMENTS

Definitions

Figure 1:
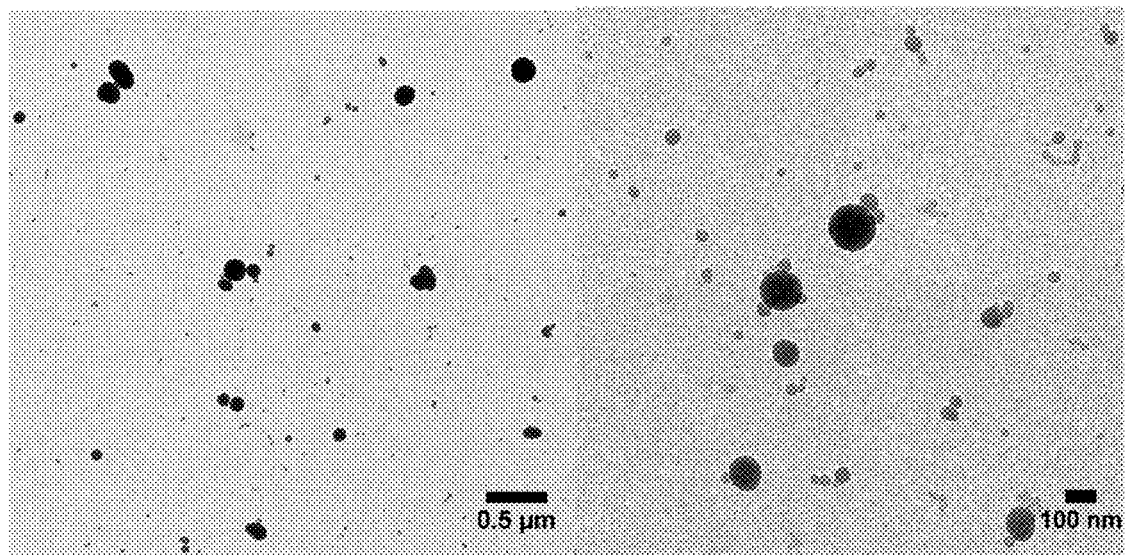
FIG. 1 is a TEM micrograph of colloidal lignin particles produced by adding lignin solution in acetone-water.

In the present context, the term "colloidal lignin particle" (abbreviated "CLP", in the plural: "CLPs") refers to lignin material that does not sediment in a fluid, in particular liquid fluid, such as water, upon holding still for at least two hours in particular at room temperature. Moreover, CLPs can be passed through a filter membrane with a particle retention value of less than 15 micrometers, preferably less than 2 micrometers, and even more preferably less than 1 micrometer.

The term "lignin nanoparticle" (abbreviated "LNP"; in the plural: "LNPs") is used interchangeably with the term CLP.

The abbreviations "THF" and "PdI" refer to tetrahydrofuran and polydispersity index, respectively.

If not otherwise indicated, any percentages and ratios are based on weight.

"Room temperature" stands for 15 to 30° C., in particular about 20 to 25° C., for example about 23° C.

"Reduced pressure" stands for an absolute pressure lower than normal pressure, i.e. lower than 101,325 Pa. In particular, the "reduced pressure" is at least 10%, preferably at least 50%, for example 90% lower than normal pressure. Typically, reduced pressure stands for an absolute pressure of about 0.001 mbar to about 500 mbar, for example about 1 to 250 mbar or 5 to 150 mbar.

"One-pot method" stands for a method in which the operations related to the forming of a dispersion, such as dissolution of lignin in a mixture of a solvent and non-solvent, and forming a dispersion of lignin by evaporation of solvent or addition of non-solvent, or both, are carried out in one (and the same) vessel.

Particle sizes for the present nanoparticles have been determined by dynamic light scattering analysis. The sizes are given as Z-average particle diameters. The Z average is the intensity weighted mean hydrodynamic size of the ensemble collection of particles measured by dynamic light scattering (DLS). The Z average is derived from a Cumulants analysis of the measured correlation curve, wherein a single particle size is assumed and a single exponential fit is applied to the autocorrelation function.

Unless otherwise indicated, viscosities were obtained by dynamic viscosity measurement, the change in the dynamic viscosity, (Pa·s), values being recorded with the increased shear strain, (1/s) at 23° C.

As will appear from the above, embodiments of the present technology relate to the field of preparation and applications of organic colloidal particles. In particular, the embodiments relates to the preparation of colloidal lignin particles via a method, such as a one-pot method, based in particular on solvent evaporation.

These particles can be used to stabilize hydrogels.

In one embodiment, the present technology relates to a method of preparing a dispersion of colloidal lignin particles. The method generally comprising at least the steps of providing a solution of lignin in a mixture of an organic solvent for lignin and a non-solvent for lignin having a ratio of solvent to non-solvent, and of decreasing the ratio of the solvent to the non-solvent to produce an aqueous dispersion of colloidal lignin particles.

Typically, the ratio of solvent to non-solvent is 10:1 to 1:1, preferably 3:1 w/w.

In one embodiment, the organic solvent is volatile. In one embodiment, the non-solvent is water.

In one embodiment, the lignin is unmodified. In the present context, the term "lignin" typically refers to lignin isolated from plant biomass using any applicable method known in the art. In one embodiment, the lignin is obtained from wood or annual or perennial plants or other lignocellulosic materials corresponding to plant biomass. In one embodiment, the lignin is obtained from wood or plants.

In one embodiment, lignin is isolated from Kraft (sulfate) pulping black liquor using, but not limited to, LignoBoost® technology.

Other lignins obtained from spent liquor or another stream, in particular sidestream, of a pulping process, in particular chemical and chemimechanical pulping process, or obtained by pulping, in particular by a chemical or chemimecahnical pulping process, are also included herein. Examples of such processes are sulphate pulping methods, sulphite pulping method, polysulphide methods and organosolv pulping methods.

"Unmodified" indicates that the lignin has not been modified, in particular chemically modified, after isolation.

In one embodiment, "unmodified lignin" refers lignin obtained as such by an isolation process.

In one of embodiment, a solution of lignin is obtained by dissolving unmodified lignin in a volatile mixture of a volatile organic solvent for lignin and water.

In one embodiment, a dispersion is obtained by adding to a solution of lignin in a mixture of an organic solvent for lignin and a non-solvent for lignin further non-solvent of lignin until a dispersion is formed.

In another embodiment, the solution of unmodified lignin is obtained by dissolving unmodified lignin in a volatile organic solvent for lignin; and adding water while maintaining the lignin in solution.

The organic solvent is preferably an organic ketone, in particular an aliphatic ketone. In one embodiment, the organic solvent is acetone.

In one embodiment, the mixture of an organic solvent for lignin and a non-solvent for lignin comprises, consists or consists essentially of acetone and water.

In one embodiment, the method comprises the steps of
providing a solution of unmodified lignin in a mixture of a volatile organic solvent for lignin and a non-solvent for lignin; and
evaporating the volatile, organic solvent for lignin, in particular at reduced pressure, to produce an aqueous dispersion of colloidal lignin particles.

In one embodiment, further non-solvent is added to the solution before evaporation.

In one embodiment, the method comprises the steps of
providing a solution of unmodified lignin in a mixture of a volatile organic solvent for lignin and a non-solvent for lignin; and
adding further non-solvent to produce an aqueous dispersion of colloidal lignin particles.

In one embodiment, the solvent mixture used for preparation of colloidal lignin particles by dilution of the organic solvent with a lignin non-solvent, such as water, corresponds to the solvent mixture used in the embodiment wherein the solvent is evaporated.

In one embodiment, the organic solvent for lignin is removed by evaporation, which typically is carried out at reduced pressure.

In one embodiment, evaporation of the solvent for lignin can be carried out at an absolute pressure of about 0.001 mbar to about 500 mbar, for example at about 1 to 250 mbar or 5 to 150 mbar.

The evaporation of the solvent can be carried out for example by a slow evaporation process or by rapid flash evaporation.

In embodiments, the method is carried out as a one-pot process. This applies to the embodiments described above.

A dispersion of colloidal lignin particles, in particular one obtained by a method as described above, typically contains colloidal lignin particles having a mean particle diameter in the range from 80 nm to 500 nm. These particle sizes have been determined by dynamic light scattering analysis and given as Z-average particle diameters. The Z average is the intensity weighted mean hydrodynamic size of the ensemble collection of particles measured by dynamic light scattering (DLS).

In one embodiment, the particles are spherical or otherwise rotationally symmetrical.

In one particular embodiment, the present technology provides a dispersion of lignin particles, in particular colloidal lignin particles, for example spherical colloidal lignin particles, having a mean particle diameter in the range from 80 nm to 500 nm dispersed in a liquid medium.

In one embodiment, the liquid medium comprises, or consists of, or consists essentially of water.

In one embodiment, the liquid medium contains some of the solvent for lignin, such as a ketone, in particular an aliphatic ketone, such as acetone.

In one embodiment, the liquid medium contains less than 20% by weight of the total composition of a solvent for lignin, such as a ketone, in particular aliphatic ketone, such as acetone. In another embodiment, the liquid medium contains less than 15%, or less than 10 or less than 5% or less than 1% by weight (of the total composition) of a solvent for lignin, such as a ketone, in particular aliphatic ketone, such as acetone.

In an embodiment, the dispersion of colloidal lignin particles having a mean particle diameter in the range from 80 nm to 500 nm is dispersed in aqueous medium containing no solvent for lignin or only traces (less than about 10 ppm)

of a solvent for lignin, such a solvent for lignin being, for example a ketone, in particular aliphatic ketone, such as acetone.

Optionally, the aqueous medium may contain some additives and adjuvants, such as salts, pH-regulating compounds, including organic and inorganic, ionic and non-ionic compounds, and combinations thereof. Typically, the amount of such compounds is 0.01 to 10%, in particular 0.1 to 5%, by weight of the total composition (dispersion).

In an embodiment, a dispersion of colloidal lignin particles, in particular obtained by a method as described above, comprises colloidal lignin particles which are capable of being passed through a filter membrane with a particle retention value of less than 15 micrometers, preferably less than 2 micrometers, and even more preferably less than 1 micrometer.

Typically, a dispersion of the present kind comprises colloidal lignin particles that do not sediment upon standing for at least two hours in particular at room temperature.

A dispersion of the present kind finds a number of uses. For example it can be used as a rheology modifier in hydrogels.

In one embodiment, the colloidal lignin particles of the dispersion are capable of stabilizing the hydrogels so that they retain their shape during storage or use in elevated humidity or in aqueous buffer solution.

In one embodiment, the rheology modifier is used in three-dimensional printing of hydrogels.

In one embodiment, the hydrogels comprise nanocellulose optionally in combination with alginates. "Alginates" have the conventional meaning in the art. In one embodiment, alginate covers algal polysaccharides such alginate or carrageenan. Alginates may be employed in the form of salts (sodium salts, for example).

In the present context, the term "nanocellulose" is used for designating generally nano-structured cellulose. Such cellulose can be cellulose nanocrystal (abbreviated "CNC" or "NCC"), fibrillated cellulose, i.e. nanofibers ("CNF") which also are referred to as nanofibrillated cellulose ("NFC") or microfibrillated cellulose ("MFC"). The term nanocellulose also covers bacterial nanocellulose, i.e. nano-structured cellulose which is produced by bacteria.

Typically, the present nanocellulose is CNF which exhibits cellulose fibrils having a thickness of about 5 to 25 nanometer and a high aspect ratio (ratio of width to length of typically 1:500, for example 1:100, such as 1:50).

The fibrils can be isolated from a cellulose raw-material, including wood and other lignocellulosic raw-materials, for example in the form of a defibered pulp (chemical or mechanical pulp), by subjecting to treatment, in particular mechanical treatment employing high-pressure, high temperature, impact homogenization, grinding, microfluidization or combinations thereof.

In another embodiment, cellulose nanocrystals (CNC) are employed. CNC can be produced from cellulose fibers by acid hydrolysis.

In one embodiment, an addition of CLP is used for increasing viscosity of a CNF-alginate hydrogel. The increased viscosity may be a result of hydrophilic surfaces of CLPs that bind water and act as non-covalent cross-linkers between CNF fibres and alginate polymers. The solid, colloidal sized particles may also enhance the mechanical properties of the hydrogel mechanically. The present invention is however not limited to these explanations.

In embodiments, the present invention increases stability of the hydrogel objects and can stabilize living cells in the matrix. Toxic crosslinking methods can be avoided. Improved cell viability in 3D cell culture can improve productivity of therapeutics or other cell metabolites. Improved structure retention of the hydrogel may enable development of better scaffolds for regenerative medicine and tissue engineering applications.

The viscosity of CNF hydrogels and thus the water retention can be adjusted by altering the consistency (dry matter concentration).

Certain applications such as 3D printing of cells may not withstand high CNF concentrations due to the associated shear forces from cellulose nanofibrils. There is thus need for using low CNF consistencies that challenge the structure retention and may lead to detrimental water migration. The present invention offers a solution based on, preferably solely, on renewable natural polymers that are safe for the patient.

In the latter case, the mechanism may be different from the above explained. It is possible that addition of the CLPs provide mechanical structure rigidity instead of chemical crosslinking. The antioxidative, and antimicrobial properties of the lignin can also add benefits, and the particles could also be used as carriers of drugs. The present invention is however not limited to these explanations.

In one further embodiment, CLPs are used as agglomeration agents for water purification.

In one embodiment, to improve the virus-affinity of the particles, anionic CLPs are coated with cationized lignin resulting in cationic lignin particles (c-CLPs) with a net positive charge that can adsorb negatively charged biomolecules.

It would appear that viruses, such as CCMVs used in the examples below, with the CLPs form agglomerated complexes that, unlike pristine virus particles, can be easily removed from water either by filtration or centrifugation.

In one embodiment, cationic particles which can be obtained, for example from quaternary amine-modified lignin, such as softwood kraft lignin, can be used for improving the binding interactions with these anionic viruses.

CLPs find use in a large variety of water purification systems such as filters, packed columns, and as flocculants.

In summary, in one embodiment, a method if provided for avoiding generation of wastewater during the preparation of colloidal lignin particles (lignin nanoparticles), wherein the inventive one-pot process uses unmodified lignin dissolved in volatile solvent mixtures containing a volatile organic solvent and water. The formation of colloidal lignin particles takes place during the evaporation of organic solvent concentration under reduced pressure. The solvent evaporation can be either a slow evaporation process or rapid flash evaporation. The same solvent mixture can be used for one-pot preparation of colloidal lignin particles by dilution of the organic solvent with a lignin non-solvent such as water.

One unexpected finding is that the colloidal lignin particles function as rheology modifier in hydrogels used in additive manufacturing, significantly facilitating easy printing of e.g. otherwise challenging CNF hydrogel. The particles furthermore stabilize the hydrogels so that they retain their shape during storage or use in elevated humidity or in aqueous buffer solution. The process enables the production of colloidal lignin particles with controlled mean particle diameter from 80 nm to approximately 500 nm.

In one embodiment, composite hydrogel formulations are provided, containing only renewable natural polymers. CLPs are spherical lignin particles that can be prepared from various different lignins, including commercially available technical lignins. By formulating CLPs in CNF-based hydrogels, the structure collapse that occurs in the absence of CLPs, can be avoided. The improved structure retention can be employed in cases where the hydrogels are used as media for 3D cell culture. In such applications, viability of living cells is crucially dependent on the surrounding support matrix, i.e. CNF or CND-alginate hydrogel.

EXAMPLES

Example 1. Preparation and Characterization of Colloidal Lignin Particles

This example describes preparation of CLPs by adding lignin solution into water. BIOPIVA 100, UPM softwood kraft lignin (7.5 g, dry basis) was dissolved in 150 g of solvent mixture of acetone-water 3:1 w/w. After three hours of stirring at 22° C., the solution was filtered through a glass microfiber filter (Whatman, Grade GF/F), and immersed into vigorously stirred deionized water (450 g) at 22° C. The formed colloid was diluted ~20 times and subjected to particle dynamic light scattering analysis.

FIG. 1 shows TEM micrographs of colloidal lignin particles produced by adding lignin solution in acetone-water 3:1 w/w into deionized water. The TEM images were acquired in bright-field mode on a FEeval Tecnai 12 operating at 120 kV.

As will appear, by the method described, colloidal lignin particles were obtained having a Z-average particle diameter of 170±3 nm and PdI of 0.15±0.02 (N=3) was obtained. The CLP dispersion was thereafter dialyzed against deionized water and subjected to transmission electron microscopy (TEM).

Example 2: Effect of pH on Particle Properties of Colloidal Lignin Particles The aim of this example is to show the effect of pH on the particle size of colloidal lignin particles. Lignin solutions at 1 wt % concentration in acetone-water 3:1 w/w solvent mixture were adjusted to predefined pH values by adding small amounts of aqueous hydrochloric acid, sodium hydroxide, or ammonium hydroxide. These lignin solutions were used for the preparation of colloidal lignin particles by a rapid pouring of deionized water as non-solvent into the lignin solution.

Figure 2:
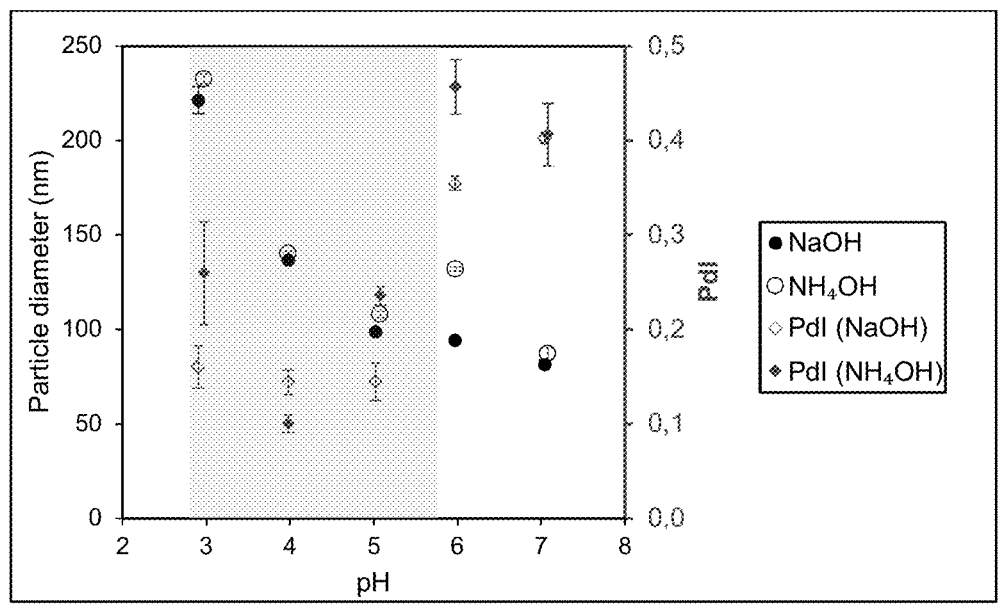
FIG. 2 is a depiction of Z-average particle diameter and polydispersity index of colloidal lignin particles formed by direct precipitation, as a function of pH.

FIG. 2 shows the effect of pH on particle size of the lignin colloids. More specifically, FIG. 2 shows CLP formation by direct precipitation. The effect of pH on Z-average particle diameter (●○) and polydispersity index (♦◇) of colloidal lignin particles prepared by adding deionized water (120 g) into 40 g of 1 wt % lignin solution in acetone-water 3:1 w/w solvent mixture. Adjustment of pH was made using aqueous hydrochloric acid, sodium hydroxide, and ammonium hydroxide.

As will appear, the Z-average particle diameter decreased when pH increased from pH 2.9 to pH 7.1, regardless of using sodium hydroxide or ammonium hydroxide for the pH adjustment.

These results show that particle size of CLPs can be controlled by adjusting pH prior to particle formation by solvent dilution with non-solvent.

Example 3: One-Pot Preparation of Lignin Particles by Acetone Evaporation: Effect of pH It is an aim of this example is to show that it is possible to control the particle size of CLPs formed by solvent evaporation of lignin solutions with predefined pH.

The initial pH of lignin solution (10 g/l) was adjusted with aqueous solutions of 1 M hydrochloric acid or 1 M sodium hydroxide. CLPs were thereafter formed and characterized as explained in Example 1.

Figure 3:
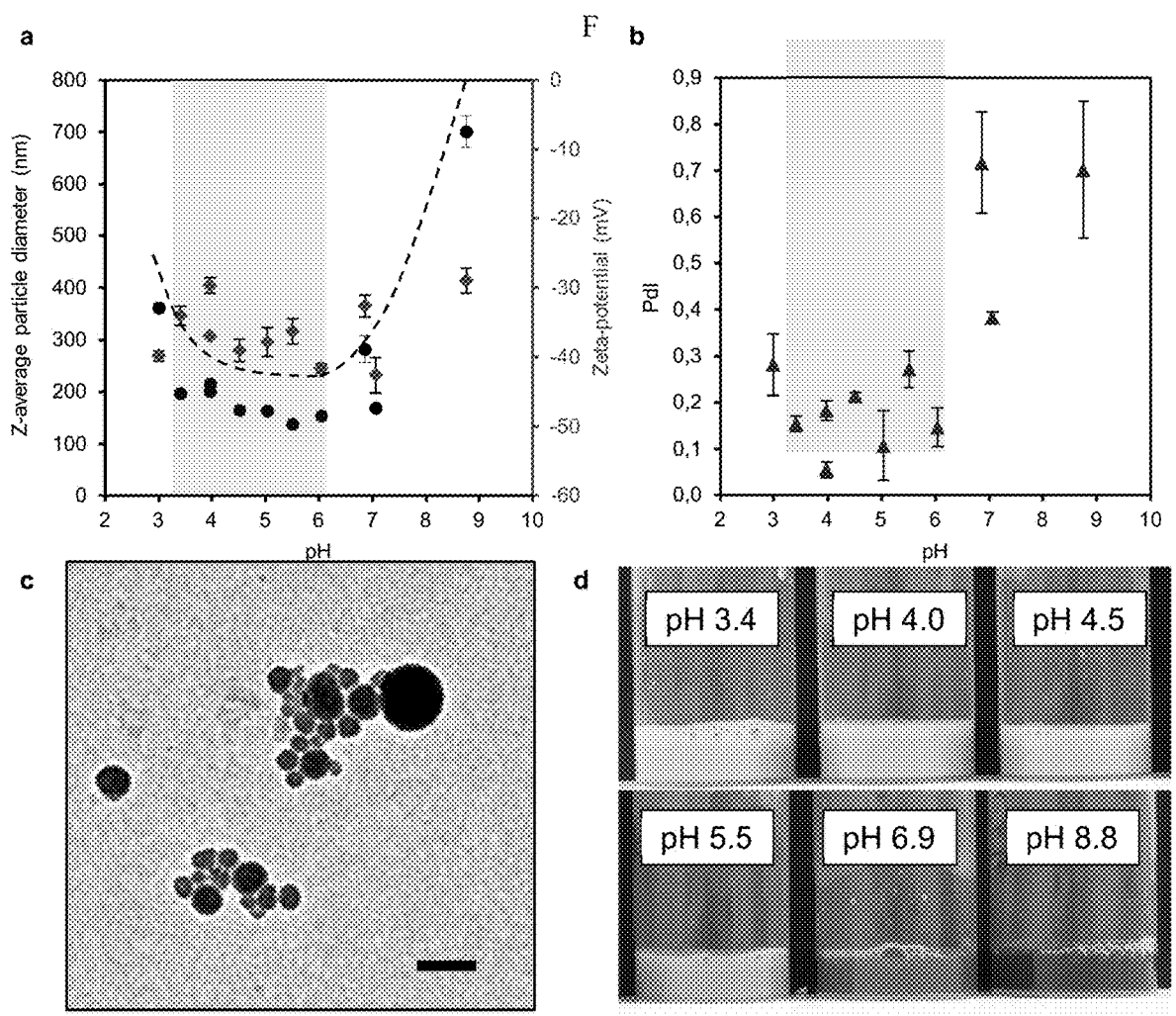
FIG. 3 illustrates the formation of CLPs by rotary evaporation.

FIG. 3 illustrates the Effect of pH on (a) particle size (●) and zeta-potential (♦) and (b) polydispersity index (PdI). (c) a TEM micrograph of CLPs at pH 4. The scale bar is 200 nm.

FIG. 3(d) shows the appearance of colloidal dispersion formed at various pH values. CLPs at a final concentration of ~3 g/l. were prepared by rotary evaporation of lignin solutions in acetone-water 3:1 w/w solvent mixture.

The results in FIG. 3a show that particle size decreased from 361 nm to 138 nm with increasing pH from 3 to 6. Associated changes in zeta-potential and PdI indicate that there is a threshold at approximately pH 6 after which irregularity and heterogeneity of lignin particle dispersions increase. TEM images of CLPs prepared at pH 4 showed expected spherical particle morphologies with some spheroidal particles. FIG. 3d shows the visual appearance of CLPs that was in line with the observed trend of aforementioned particle properties as a function of pH.

Example 4: One-Pot Preparation of Lignin Particles by Acetone Evaporation: Effect of Initial Lignin Concentration The aim of this example is to show the effect of initial lignin concentration on mass yield and particle properties of CLPs from the acetone evaporation process. Softwood Kraft lignin was dissolved in a mixture of acetone and water 3:1 w/w in concentrations (g/l) 1.25, 2.5, 5.0, 12.5, 25.0, and 50.0. These lignin solutions (40 ml) were separately evaporated to a final volume of approximately 7 ml, and the formed CLPs were analyzed for particle size, zeta-potential, and gravimetric mass yield relative to initial lignin amount (dry basis).

FIG. 1 shows the formation of CLPs by rotary evaporation. Effect of initial lignin concentration on (a) particle size (-●-) and zeta-potential (--♦--) (b) mass yield (c) appearance of lignin particles formed upon rotary evaporation of all of the acetone from lignin solutions at initial concentrations 1.25-50 g/l in the solvent mixture of acetone:water 3:1 w/w under reduced pressure at 30° C.

Results in FIG. 4a show that particle size increased from 165 nm at the most dilute initial lignin concentration of 1.25 g/l to 545 nm at 12.5 g/l, with a drastic increase after 25 g/l initial concentration. The Zeta-potential became less negative with increasing lignin concentration within the concentration range studied. The low zeta-potential values at high lignin concentrations probably cause aggregation that reduces the mass yield of CLPs (FIG. 4b).

Figure 4:
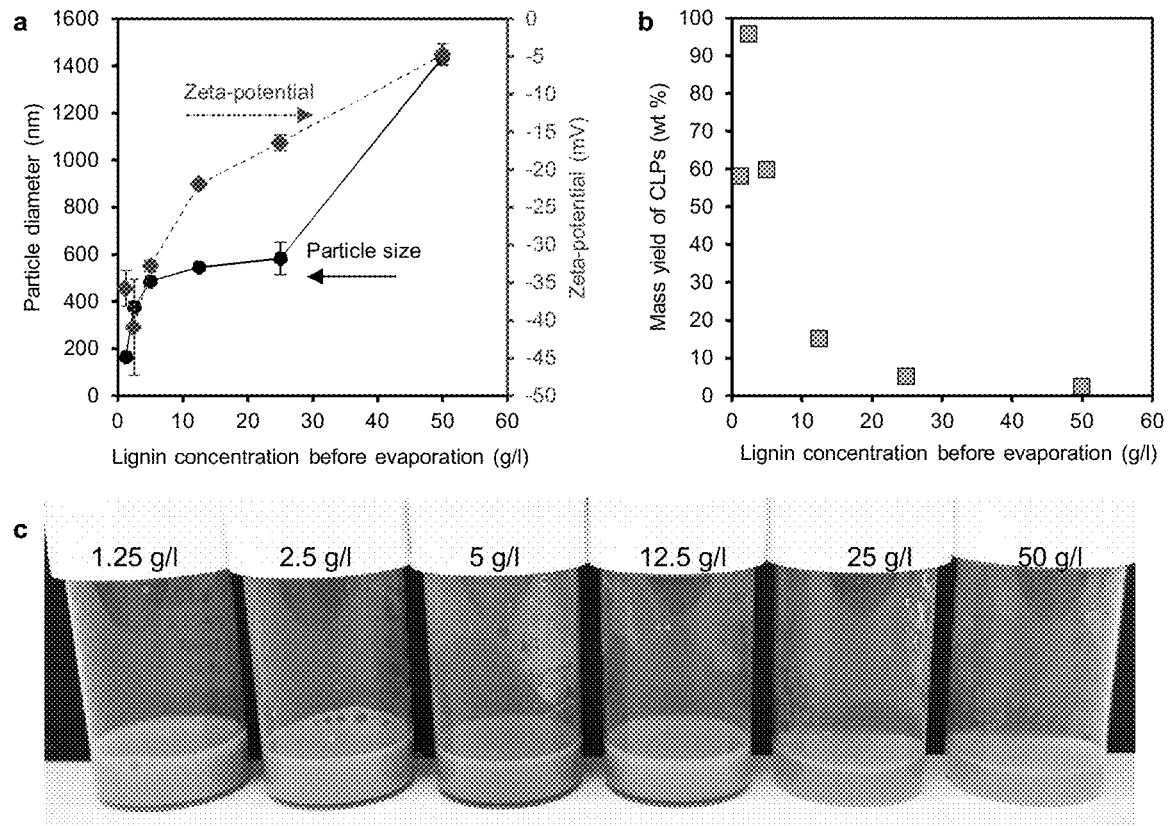
FIG. 4 shows Formation of CLPs by rotary evaporation.

As will become clear from FIG. 4, the appearance of CLPs changed from brown turbid colloid to transparent yellow-brown dispersion as the mass yield dropped from 96% to 5% with increasing initial lignin concentration from 2.5 g/l to 25 g/l. In order to produce CLPs at high concentrations, it would be preferable to form the CLP dispersion as in Example 1, followed by evaporation of solvents.

Example 5: One-Pot Preparation of Concentrated CLP Dispersion

Softwood kraft lignin (7.5 g, dry basis) was dissolved in 150 g of acetone-water 3:1 w/w solvent mixture. After three hours of stirring at 22° C., the solution was filtered through a glass microfiber filter (Whatman, Grade GF/A), and CLPs were formed by adding 450 g of deionized water as non-solvent into this lignin solution. While working in one-pot, acetone was removed by rotary evaporation under reduced pressure at 45° C., and concentrated dispersion was filtered through a Whatman GF/A membrane, giving a 10 wt % dispersion at mean particle diameter (Z-average) of 142±1 nm and PdI of 0.13±0.02. This example shows that CLPs can be obtained in one-pot process by using water as a non-solvent, without separating the particles, and enabling preparation of colloidally stable dispersion at elevated concentration.

Example 6: Comparison of Acetone and Tetrahydrofuran in Aqueous Solvent Mixtures Used in CLP Preparation by Solvent Evaporation This example compares particle size and zeta-potential of CLPs prepared from acetone-water 3:1 w/w solvent system (results from Example 3) to the corresponding properties of CLPs prepared by using tetrahydrofuran instead of acetone in the solvent system. The results in Table 1 show that the former solvent system gives CLPs with particle size that is less than half of the ones from aqueous THF, regardless of the higher initial lignin concentration in the case of acetone-water solvent mixture.

TABLE 1

Formation of CLPs by rotary evaporation. Comparison of particle sizes and zeta-potentials of CLPs prepared by solvent evaporation from acetone-water and THF-water solvent systems.

| Solvent system | Initial lignin concentration prior to evaporation (g/l) | Z-average particle diameter (nm) | PdI | Zeta-potential (mV) |
|---|---|---|---|---|
| Acetone-water 3:1 w/w | 1.25 | 165 ± 4 | 0.10 ± 0.01 | −36 ± 1 |
| THF-water 3:1 w/w | 0.61 | 454 ± 19 | 0.13 ± 0.03 | −39 ± 1 |

Figure 5:
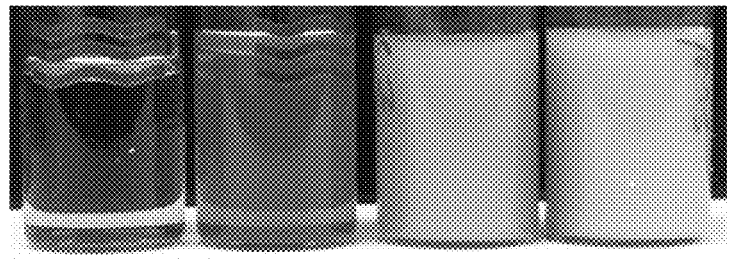
FIG. 5 is a photograph showing four solutions respectively dispersions according to an embodiment of the invention in which different amounts of solvent has been evaporated.

FIG. 5 shows four samples containing various amounts of acetone in water. As can be seen, a stable dispersion is formed already when about 75% by weight of the acetone has been evaporated off.

Example 7: Effect of CLPs on Viscosity of Cellulose Nanofibril-Sodium Alginate Hydrogel This example demonstrates the use of CLPs produced from acetone-water solvent mixture as rheology modifiers in hydrogels used in for example additive manufacturing (three-dimensional (3D) printing). CLPs prepared according to Example 5 were freeze dried and added in various weight percentages into cellulose nanofibril (CNF)—sodium alginate hydrogel. The base hydrogel consisted of 2.0 wt % of CNF and 0.5 wt % of sodium alginate relative to the total weight of the hydrogel. The content of CLPs (Z-average particle diameter 103±2 nm, PdI 0.108±0.003) was varied from 1 wt % to 25 wt % relative to the dry weight of CNF. The hydrogel mixtures were subjected to dynamic viscosity tests using an Anton Paar Physica 302 rheometer.

Figure 6:
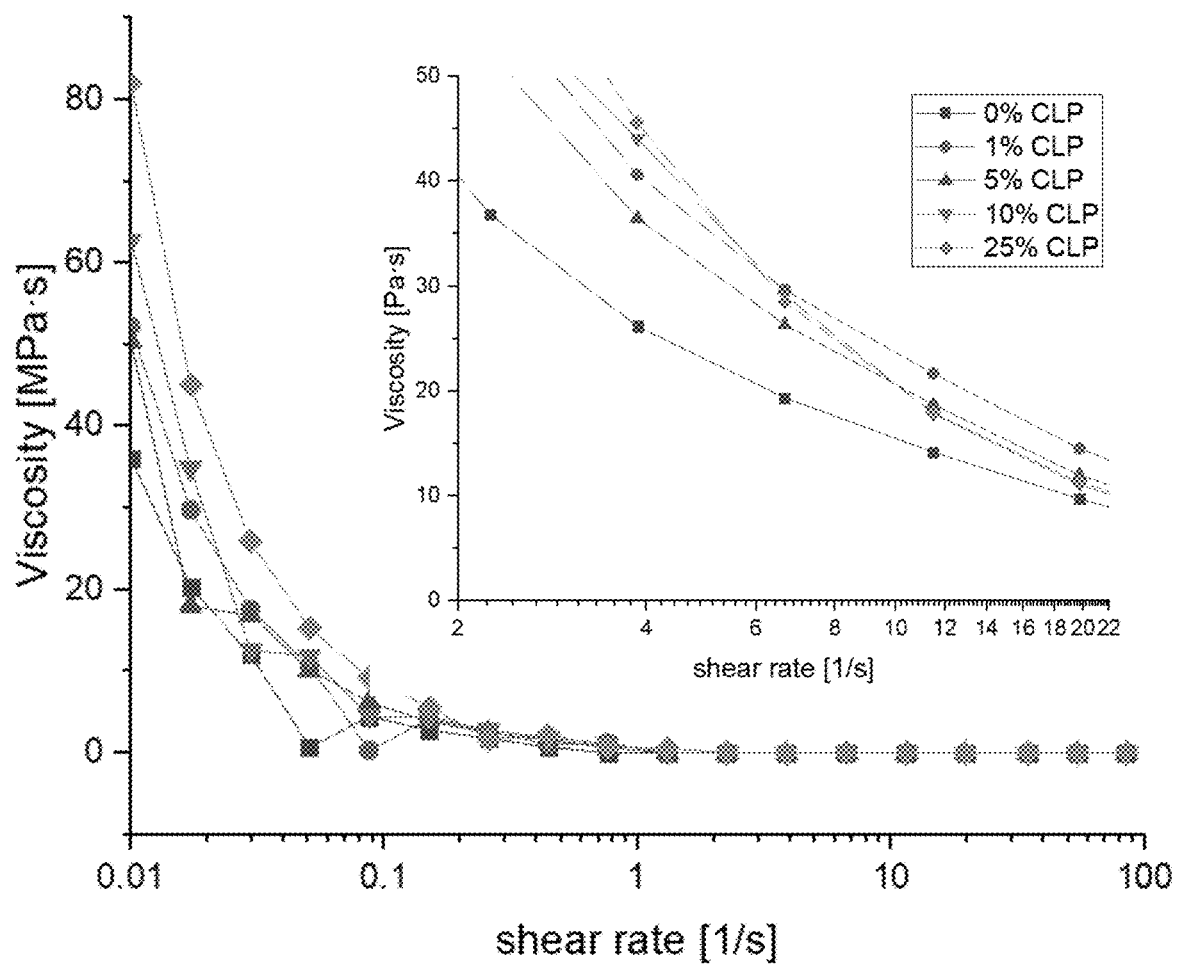
FIG. 6 is a depiction of the effect of colloidal lignin particles on viscosity of CNF-alginate hydrogels.

FIG. 6 shows the effect of colloidal lignin particles on viscosity of CNF-alginate hydrogels. Weight percentage values of CLPs are given relative to the dry weight of CNF (constant at 2 wt %).

The results in FIG. 6 show that the dynamic viscosity of the hydrogel increased significantly, but non-linearly with increasing CLP content. At a shear rate of 3.9 $s^{-1}$, the hydrogel with 25 wt % of CLPs exhibited 74% higher viscosity compared to the viscosity of the base hydrogel without CLPs. Therefore, CLPs can be used to modulate rheological properties of hydrogel formulations for applications such as 3D printing. The increased viscosity at low or no share rate combined with low viscosity at high share rate was very beneficial for the printability of the hydrogel.

Example 8: Application of CLPs in Three-Dimensional Printing Hydrogels

The hydrogel formulations from Example 7 were 3D printed using a type BIO X 3D printer. Hydrogels were pneumatically extruded through a nozzle with an internal diameter of 0.63 mm. The 3D-printed hydrogel constructs were transferred to a physiological buffer solution for storage during 7 days without agitation at 22° C. After the storage time, the hydrogels were transferred onto Petri dishes and photographed for comparison of structure retention.

FIG. 2 shows the effect of CLPs on stability of 3D-printed hydrogels. The figure panels show the hydrogels (a) directly after 3D printing, (b) the effect of immersion in 0.09 M calcium chloride for a few hours, (c) the effect of 7 days storage in 0.16 M aqueous salt solution (modified Dulbecco's Modified Eagle's Medium, pH 7.4) at 22° C., and (d) the effect of 7 days storage at 95% relative humidity at 37° C.

Figure 7:
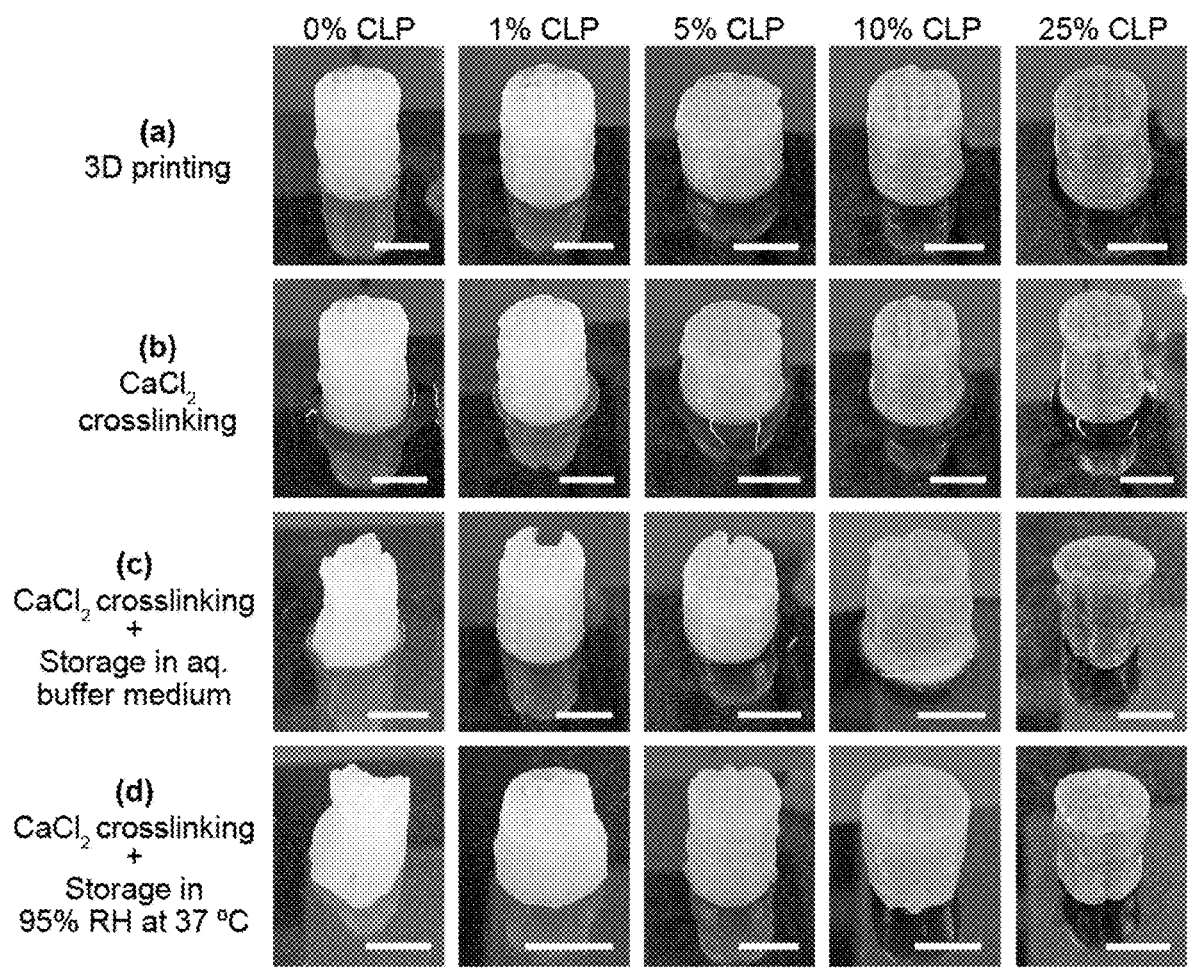
FIG. 7 comprises a number of photographs indicating the shape of 3D-printed hydrogels.

The results in FIG. 7 show that all hydrogels that contained CLPs retained their 3D-printed structure better than the base hydrogel without CLPs. Effect of storage under conditions of 95% relative humidity and 37° C. was tested to assess stability of the 3D-printed hydrogels in physiological conditions such as on the skin. Results in FIG. 7 show that the CLPs enhanced the form stability of the hydrogels also in high humidity. Especially the hydrogel containing 10 wt % of CLPs retained its original shape, suggesting that there is an optimum concentration of CLPs with respect to shape retention.

Weight percentage values of CLPs are given relative to the dry weight of CNF. All scale bars: ~1 cm.

Example 9: Preparation of Colloidal Lignin Particles (CLPs and c-CLPs)

CLPs were produced by dissolving Softwood kraft lignin (SKL, BioPiva 100 from UPM), "SKL" in acetone:water (volume ratio, 3:1). Insoluble impurities were removed by filtration, and CLPs were formed by rapid pouring of lignin solution into water. CLPs were purified by dialysis against water.

Cationic lignin particles (c-CLPs) were prepared by adding the CLP dispersion into the water-soluble fraction of cationic lignin under vigorous stirring. The cationic lignin used had a composition containing 2.06 mmol $g^{-1}$ of aliphatic groups, 0.48 mmol $g^{-1}$ of carboxylic acids, 4.01 mmol $g^{-1}$ of phenolic groups and a total amount of 6.55 mmol $g^{-1}$ hydroxyl groups.

The ratio of cationic lignin to CLPs was 200 mg/g. Two batches of each type of particles were prepared. Characterization of the second batches can be found in Table 2.

Negatively charged cowpea chlorotic mottle viruses (CCMVs) were utilized as a model system for biological target. CCMV particles were grown and isolated from California black-eye beans.

Particle size and zeta potential of CLPs, c-CLPs, and CCMVs were measured using a Malvern Zetasizer Nano-ZS90 instrument (UK). The zeta potential was determined with a dip cell probe and calculated from the electrophoretic mobility data using a Smoluchowski model. Three runs from each sample preparation were measured to evaluate the reproducibility of the measurement. A volume of 1 mL was collected for all measurements with a concentration of 0.2 mg mL$^{-1}$ for CLPs, c-CLPs and of 0.05 mg mL$^{-1}$ of CCMVs. For the c-CLP:CCMV mixture, a volume ratio of 1:1 was used.

TABLE 2

Main characteristics of lignin samples tested for virus adsorption experiments. At least three measurements were completed for each parameters. Error ranges are standard deviations.

| Lignin format | Hydrodynamic diameter (nm) | PDI | Zeta potential (mV) |
|---|---|---|---|
| CLPs[a] | 108.6 ± 1.7 | 0.065 ± 0.020 | −35.9 ± 1.6 |
| Cationic lignin[b] | N/A | NA | +21.3 ± 0.5 |
| c-CLPs[a] | 122.4 ± 0.5 | 0.056 ± 0.005 | +24.1 ± 1.4 |

N/A: not analyzed;
[a]Values measured at pH 5 in 10 mM NaOAc buffer,
[b]Value at pH 5 was taken from Sipponen et al.

The hydrodynamic diameters (Dh) of CLPs and c-CLPs were 109 nm and 122 nm, respectively. The slightly larger size of c-CLPs is due to the coating of CLPs with cationic lignin molecules. The diameter of the CCMVs was 30 nm, which is close to the literature value of 28 nm. The isoelectric point (pI=3.8) of CCMVs indicate negative charge at pH 5 used in the experiments.

Figure 8:
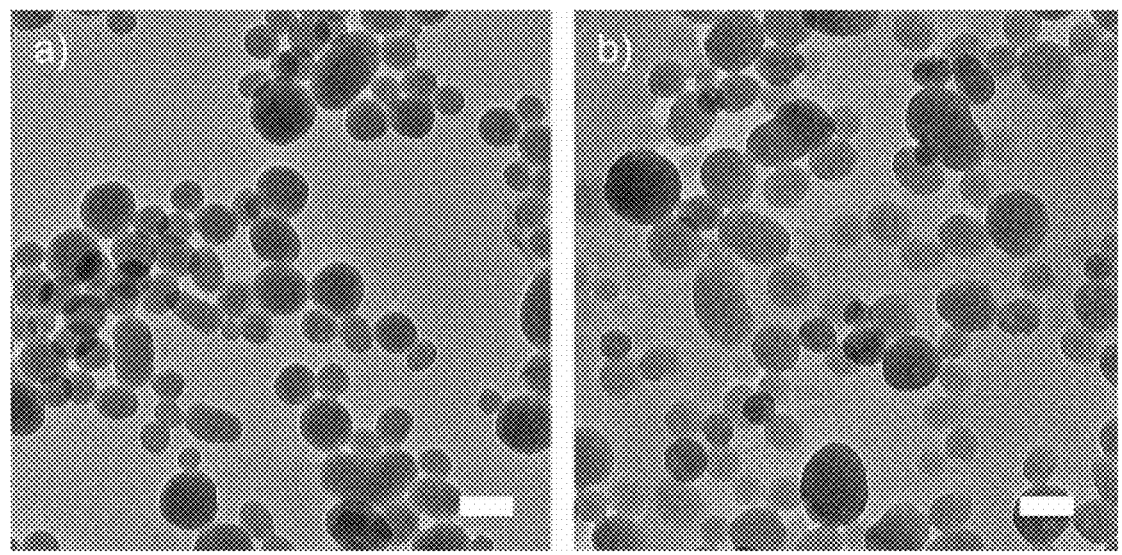
FIG. 8 is a TEM micrograph of colloidal lignin particles produced according to example 10.

To evaluate differences in particle shape and morphology, the anionic and cationic colloidal lignin particles were imaged using TEM (FIG. 8).

For both of the materials, individual particles were identified. The CLPs and c-CLPs that were prepared from acetone solution and used here were smaller (Dh~100 nm) than the CLPs previously obtained from aqueous THF or THF:ethanol mixture (Dh~200-300 nm). Due to its smaller size in comparison to THF, acetone can be more rapidly removed from the solvated lignin molecules, causing more rapid aggregation and thus smaller particles.

Example 11: Affinity of Viruses to Lignin Materials

Dynamic Light Scattering (DLS) experiments were performed to preliminarily evaluate the possible interactions between the c-CLPs and anionic virus particles. The measured hydrodynamic diameters of CCMVs and c-CLPs were 30 nm (±0.1 nm) and 126 nm (±0.9 nm), respectively, with a low polydispersity index (PDI) value for both (0.08±0.02 and 0.10±0.04, respectively.

When c-CLPs were mixed with CCMVs at a 4:1 weight ratio, the average diameter of the particles increased to 207 nm (±3.3 nm) with a low PDI of 0.12±0.01. This is more than what would be expected if a monolayer of viruses adsorbed on CLPs, and suggests that c-CLPs could act as an efficient flocculating agent. Furthermore, no second peak around 30 nm was detected during the DLS measurement of the mixture, thus no free viruses were detected, which in turn suggests a complete association of CCMVs with c-CLPs. Furthermore, intensity distribution and autocorrelation function curves of the materials indicated monodisperse distributions.

When an increasing concentration of c-CLPs and soluble cationic lignin was added, we observed that the virus migration was completely prevented at the highest concentration tested (c.a. 200 mg L$^{-1}$ of lignin). However, the virus migration appeared to be hindered already at a lower lignin concentration with the c-CLPs (100 mg L$^{-1}$) as compared to 200 mg L$^{-1}$ for soluble cationic lignin.

Thus, the insoluble cationic lignin particles appeared more capable to associate with CCMVs that the soluble cationic lignin molecules.

Not only cationic particles but also the negatively charged CLPs can partially interact with the viruses. In this case, the behavior was different, since the intensity of the virus band decreased already from lower concentration (10 mg L$^{-1}$) than observed with cationic samples, but did not disappear completely even at the highest lignin concentration (189 mg L$^{-1}$).

These observations can be confirmed by quantification of migration bands. It has been shown that there is a reduction of 67% in virus concentration when the concentration of CLPs was twice as high as the concentration of viruses (at 100 mg L$^{-1}$). At the same lignin:virus ratio, the c-CLPs reduced 59% of the virus concentration, while it was only of 27% for cationic lignin. The reduction in the mobility of CCMVs could even reach 90-95% with all the tested lignin materials when the lignin amount was four times as high as that of the viruses.

Clearly, the lignin particles interacted with viruses not only electrostatically, but also by other non-covalent interactions. There may be hydrophobic interactions present or direct interactions due to the incompletely understood nanoporous structure of lignin particles.

Figure 9:
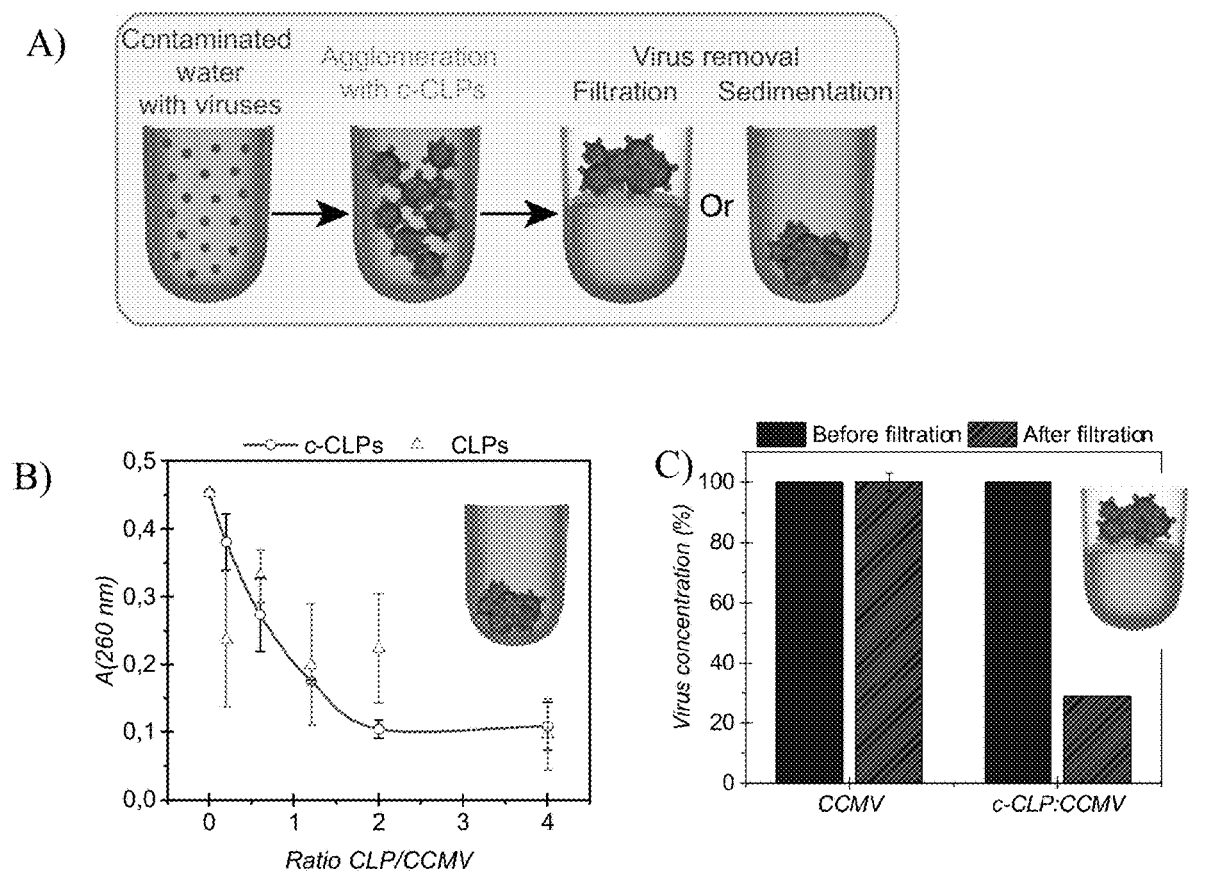

The compositions herein disclosed can be used for water purification for example using the method involving sedimentation assisted by centrifugation and filtration of the formed complexes shown in FIG. 9 (FIGS. 9a to 9c).

One of the main advantages from using colloidal lignin particles for virus removal is the possibility to form flocs that easily sediment or can be filtrated away from the water and combusted. The simplicity of the approach, the availability of lignin in large quantities to a relatively low price and the techno-economical feasibility of the CLP manufacturing, make this a suitable method for example in cases where there is a scarceness of clean water.

REFERENCES

[1] L. Z. Liu, J. C. Gast, K. J. Bottorff, Lignin Nanoparticle Dispersions and Methods for Producing and Using the Same, 2015, US 2015/0166836A1.
[2] Z. Li, Y. Ge, X. Duo, Method for Preparing Lignin Nanoparticles by Taking Papermaking Black Liquid as Raw Material, 2013, CN103275331A.
[3] Y. Deng, H. Zhao, X. Qiu, Q. Wang, Q. Shi, Y. Qian, Lignin Is a Kind of Carbon Spheres and Preparation Method and Application of the Nitrogen-Doped Material, 2016, CN106276848B.
[4] D. Yang, Y. Li, X. Qiu, Y. Qian, H. Lou, J. Huang, Y. Pang, Titanium Dioxide/Lignin-Based Composite Nanoparticle, and Preparation Method and Application Thereof, 2016, CN106633967A.
[5] S. M. Dirk, K. N. Cicotte, D. R. Wheeler, D. A. Benko, Lignin Nanoparticle Synthesis, 2015, U.S. Pat. No. 9,102,801B1.
[6] X. Qiu, D. Yang, W. Guo, M. Zhou, J. Huang, C. Yi, Y. Li, Inorganic/Lignin Type Polymer Composite Nanoparticles, Preparation Method Therefor and Application Thereof, 2016, US2016312031A1.

[7] A. E. Lanterna, J. Scaiano, Lignin-Coated Metal Oxide Nanoparticles and Use Thereof in Cosmetic Compositions, 2017, WO2017197530A1.

[8] M. S. Dimitri, Production of High Surface Area Lignins by Spray Drying, 1974, U.S. Pat. No. 3,808,192.

[9] M. S. Dimitri, Submicron Lignin Dispersions, 1990, U.S. Pat. No. 4,957,557.

[10] 托比亚斯, 维特曼, Method for Obtaining Stabilized Lignin Having a Defined Particle-Size Distribution from a Lignin-Containing Liquid, 2014, CN106574053A.

[11] C. Jiang, Method for Preparing Nano-Sized Carbon Black by Lignin at Large Scale, 2016, CN106497149A.

[12] X. Qiu, Q. Yong, Z. Xiaowen, Y. Dongjie, D. Yonghong, L. Hongming, Lignin Reverse Phase Nanometer Colloid Sphere as Well as Preparation Method and Application Thereof, 2015, CN105153720B.

[13] Z. Li, K. Yan, Xiaoduo, G. Yuanyuan, A Method of Preparing Lignin Dithio Carbamate Nanoparticles, 2014, CN104371117B.

[14] L. Dai, C. Si, R. Liu, Magnetic Lignin Nano Drug Carrier, 2014, CN107693506A.

[15] X. Qiu, Y. Qian, Z. Dongjie, Z. Xiaowen, Y. Shiping, Lignin Nano-Particles with High Ultraviolet Protection Performance and Preparation Method of Lignin Nano-Particle, 2016, CN106361591A.

[16] L. Dai, L. Weizhen, Z. Jinshun, The Method of Producing a PH-Sensitive Hydrogel Nanocomposite, 2018, CN108610492A.

[17] Sipponen, M. H.; Smyth, M.; Leskinen, T.; Johansson, L. S.; Österberg, M. All-Lignin Approach to Prepare Cationic Colloidal Lignin Particles: Stabilization of Durable Pickering Emulsions. *Green Chem.* 2017, 19 (24), 5831-5840.

The invention claimed is:

1. A method of preparing a dispersion of colloidal lignin particles, the method comprising the steps of:
providing a solution of lignin in a mixture of an organic solvent for lignin and a non-solvent for lignin having a ratio of the organic solvent to the non-solvent; and
decreasing the ratio of the organic solvent to the non-solvent to produce an aqueous dispersion of colloidal lignin particles,
wherein the ratio of the organic solvent to the non-solvent is decreased solely by evaporating the organic solvent.

2. The method according to claim 1, wherein the ratio of solvent to non-solvent is 10:1 to 1:1 w/w.

3. The method according to claim 1, wherein the organic solvent is volatile and/or the organic solvent is a ketone.

4. The method according to claim 1, wherein the lignin is unmodified.

5. The method according to claim 1, wherein the lignin is unmodified and the organic solvent is volatile.

6. The method according to claim 1, wherein the mixture of the volatile organic solvent for lignin and the non-solvent for lignin is provided at a weight ratio of 10:1 to 1:1.

7. The method according to claim 1, wherein the solution of lignin is obtained by dissolving unmodified lignin in a mixture of a volatile organic solvent for lignin and water, said organic solvent for lignin being a ketone.

8. The method according to claim 4, wherein the solution of unmodified lignin is obtained by:
dissolving unmodified lignin in a volatile organic solvent for lignin; and
adding water while maintaining the lignin in solution.

9. The method according to claim 5, wherein evaporation of the solvent is carried out at reduced pressure of about 0.001 mbar to about 500 mbar.

10. The method according to claim 4, wherein the unmodified lignin comprises lignin obtained from plant biomass.

11. The method according to claim 1, further comprising a one-pot process for producing the dispersion.

12. The method according to claim 1, further comprising preparing a dispersion of colloidal lignin particles having a mean particle diameter in the range from 80 nm to 500 nm in a liquid medium, said liquid medium being water, or water containing less than 15% by weight of a solvent for lignin.

13. The method according to claim 1, further comprising preparing a dispersion of colloidal lignin particles which are capable of being passed through a filter membrane with a particle retention value of less than 15 micrometers.

14. A method of preparing a dispersion of colloidal lignin particles, the method comprising the steps of:
providing a solution of lignin in a mixture of an organic solvent for lignin and a non-solvent for lignin having a weight ratio of the organic solvent to the non-solvent; and
decreasing the weight ratio of the organic solvent to the non-solvent to produce an aqueous dispersion of colloidal lignin particles, wherein the decreasing of the ratio of the organic solvent to the non-solvent is done in the absence of the addition of water to the solvent.

15. A method of preparing a dispersion of colloidal lignin particles, the method comprising the steps of:
providing a solution of lignin in a mixture of an organic solvent for lignin and a non-solvent for lignin having a weight ratio of the organic solvent to the non-solvent; and
decreasing the weight ratio of the organic solvent to the non-solvent to produce an aqueous dispersion of colloidal lignin particles, wherein the ratio of solvent to non-solvent is 5:1 to 1:1 w/w.

16. The method according to claim 15, wherein the ratio of solvent to non-solvent is 3:1 to 1:1.

\* \* \* \* \*